United States Patent [19]

Ogawa

[11] Patent Number: 4,630,851
[45] Date of Patent: Dec. 23, 1986

[54] PIPE COUPLINGS

[75] Inventor: Susumu Ogawa, Osaka, Japan

[73] Assignee: Fujikin International, Inc., Osaka, Japan

[21] Appl. No.: 480,235

[22] Filed: Mar. 30, 1983

[30] Foreign Application Priority Data

Mar. 30, 1982 [JP] Japan .................. 57-46747[U]

[51] Int. Cl.$^4$ .................................................. F16L 19/08
[52] U.S. Cl. ................................. 285/341; 285/382.7; 285/917; 285/923
[58] Field of Search ............... 285/382.7, DIG. 18, 285/DIG. 17, DIG. 24, DIG. 12, 341, 917, 923; 277/235

[56] References Cited

U.S. PATENT DOCUMENTS

| | | | |
|---|---|---|---|
| 2,171,217 | 8/1939 | Kreidel | 285/382.7 X |
| 2,414,995 | 1/1947 | Wurzburger | 285/382.7 X |
| 2,819,099 | 1/1958 | Rittle | 277/235 X |
| 2,863,679 | 12/1958 | Dunbar | 285/DIG. 17 X |
| 3,215,457 | 11/1965 | Teeters | 285/341 |
| 3,490,777 | 1/1970 | Emmerson | 277/235 X |
| 3,499,671 | 3/1970 | Osborne | 285/341 |
| 3,501,158 | 3/1970 | Tillman, III | 277/235 X |
| 3,643,984 | 2/1972 | Bucceri | 285/382.7 X |
| 4,076,286 | 2/1978 | Spontelli | 285/382.7 X |

Primary Examiner—Thomas F. Callaghan
Attorney, Agent, or Firm—Armstrong, Nikaido, Marmelstein & Kubovcik

[57] ABSTRACT

The pipe coupling is of compression type and comprises a main body having externally threaded portions, a nut and at least one sleeve. The sleeve is formed with a ceramic coating layer on its entire surface.

3 Claims, 3 Drawing Figures

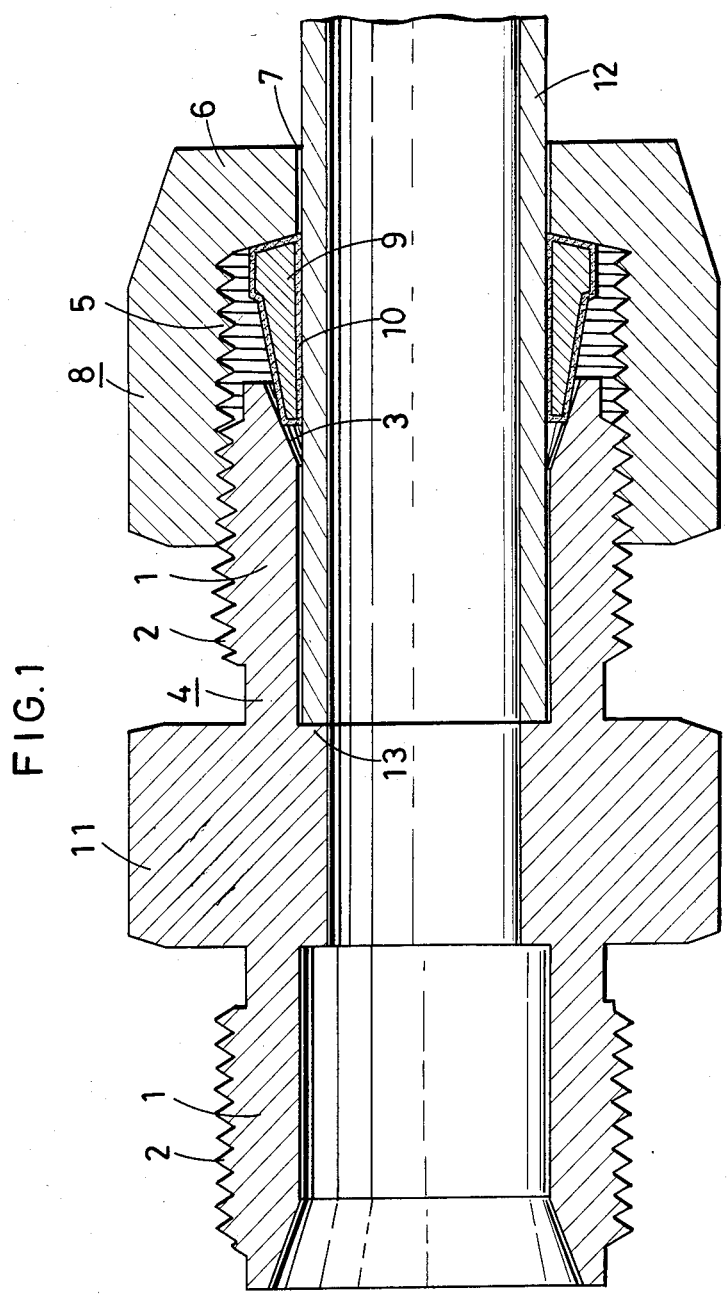

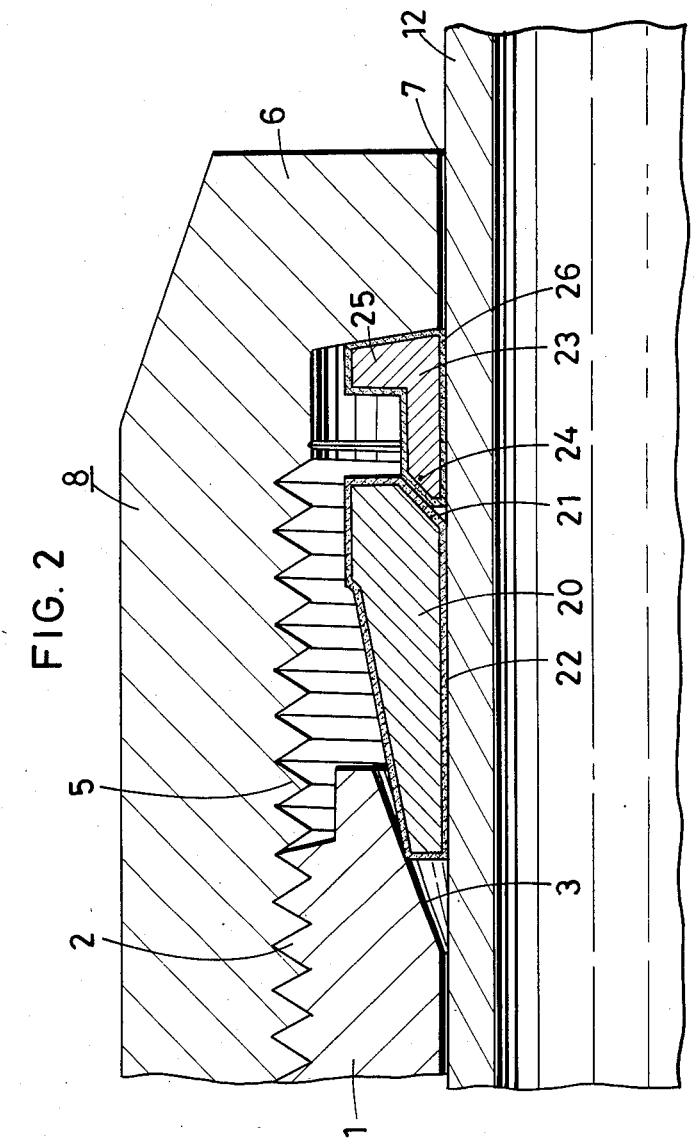

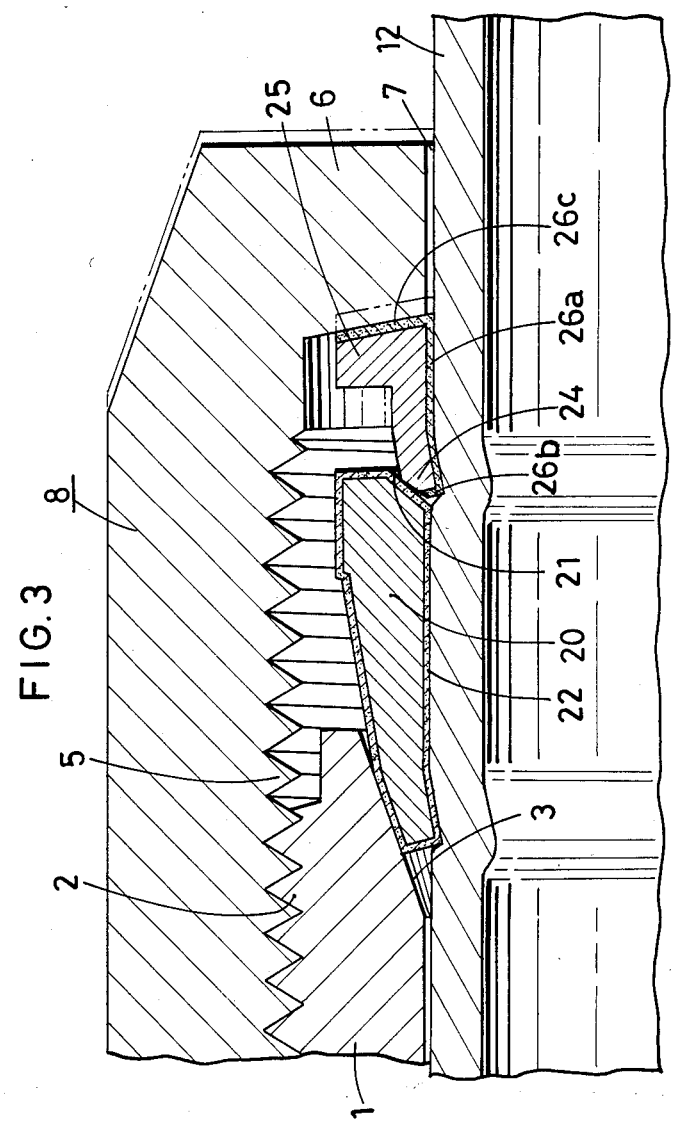

PIPE COUPLINGS

BACKGROUND OF THE INVENTION

The present invention relates to pipe couplings, and more particularly to compression pipe couplings.

The pipe coupling of such compression type has been conventionally known, which comprises a hollow main body having two ends, at least one of the ends having an externally threaded portion and a tapered portion on its inner surface; a cap nut having an internally threaded portion engageable with the externally threaded portion of the main body and a pipe passing bore formed in the center of its top wall; and a metal sleeve provided on its outer surface with a tapered portion having a smaller angle of inclination than the tapered portion of the main body. Further, also conventionally known is a pipe coupling which includes a metal front sleeve provided with a sphero-concave portion formed in its rear end centrally thereof, and a metal rear sleeve disposed to the rear of the front sleeve and provided at its front end with a sphero-convex portion fittable in the concave portion of the front sleeve.

Throughout the specification and the appended claims, the term "front" refers to the forward side with respect to the direction of advance of a nut when it is tightened, and the term "rear" to the reverse side.

According to the foregoing conventional pipe couplings, when the fluids passing through the pipe are those which corrode metals, like hydrofluoric acid or acetic acid, the sleeve had to be made of an expensive special alloy so as to be corrosion resistant. Moreover, on firmly tightening the nut, the sleeve was caused to seize the portions of main body, nut or another sleeve, in contact therewith since it was made of metal.

SUMMARY OF THE INVENTION

The present invention has overcome the conventional problem and provides a pipe coupling comprising at least one sleeve formed with ceramic coating layer, whereby corrosion resistance can be given to the metal sleeve at low cost. Further, wear resistance is increased and at the same time the problem of seizure is solved. In addition, since the portion where the sleeve bites the pipe increases the hardness, effective biting is performed to result in assuring firm connection of pipes and improving the sealing effect.

This invention will be described below with reference to the drawings in greater detail.

BRIEF DESCRIPTION OF THE DRAWINGS

FIG. 1 is a view in longitudinal section showing a pipe coupling embodying the invention, with a pipe inserted therein and a nut slightly tightened;

FIG. 2 is a sectional view, partly enlarged, which shows another pipe coupling embodying the present invention; and FIG. 3 is a longitudinal sectional view, partly enlarged, which shows a further pipe coupling embodying the present invention after a nut has been tightened.

DESCRIPTION OF THE PREFERRED EMBODIMENT

The like part is referred to by the like numeral.

FIG. 1 illustrates a pipe coupling embodying the present invention with a pipe inserted therein and a nut slightly tightened.

With reference to FIG. 1, a pipe coupling comprises a hollow main body 4 having two ends 1, each of the two ends having an externally threaded portion 2 and a tapered portion 3 on its inner surface; a cap nut 8 having an internally threaded portion 5 engageable with the externally threaded portion 2 of the main body 4 and a pipe passing bore 7 formed in the center of its top wall 6; and a sleeve 9 made of stainless steel and provided on its outer surface with a tapered portion having a smaller angle of inclination than the tapered portion 3 of the main body 4. A ceramic coating layer 10 is formed over the entire surface of the sleeve 9. The ceramic coating layer 10 is preferably 2-50 μm in thickness. With the thickness of less than 2 μm, the formed ceramic coating cannot bring foth any effects. On the other hand, if the thickness exceeds 50 μm, increase of thickness cannot give the proportional effect and therefore is economically disadvantageous. Preferable examples of ceramics are those including TiC $Al_2O_3$ or TiN as a main component. Examples of coating process are vapor deposition, flame spraying and plasma plating. The rear surface of the sleeve 9 which abuts against the inner surface of the top wall of the nut 8 and the inner surface of the top wall of the nut 8 have tapered faces, respectively, which extend obliquely straight at the same angle of inclination in longitudinal section. The main body 4 has a flange 11 on its outer surface centrally thereof. Provided on the inner surface of the flange 11 is an annular inward projection 13 which inwardly protrudes by the distance corresponding to the thickness of the pipe 12 to be connected.

The nut 8 and the sleeve 9 to be provided on the left end 1 of the main body 4 are not shown in FIG. 1.

FIG. 2 shows another pipe coupling of the invention in the same status as in FIG. 1.

This embodiment has two, front and rear, sleeves made of stainless steel. The front sleeve 20 is provided with a tapered portion having a smaller angle of inclination than the tapered portion 3 of the main body 4 and a recessed portion 21 in the rear end centrally thereof. The front sleeve 20 is formed with a ceramic coating layer 22 over its entire surface. The rear sleeve 23 is disposed to the rear of the front sleeve 20. And it is provided at its front end with a projecting portion 24 fittable in the recessed portion of the front sleeve 20 and a flange 25 abutting against the top wall inner surface of the nut 8. Further, a ceramic coating layer 26 is formed over its entire surface. The recessed portion 21 of the front sleeve 20 and the projecting portion 24 of the rear sleeve 23 have tapered faces, respectively, which extend obliquely straight at the same angle of inclination in longitudinal section. Moreover, the rear surface of the flange 25 and the top wall inner surface of the nut 8 are provided with tapered faces, respectively, which extend obliquely straight at the same angle of inclination in logitudinal section.

FIG. 3 shows a further pipe coupling of the invention after a nut has been firmly tightened. The chain line shows the pipe coupling prior to tightening the nut.

This embodiment is common to the embodiment of FIG. 2 except the portion where the ceramic coating layer of the rear sleeve is formed. More specifically, the rear sleeve 23 is formed with ceramic coating layers 26a, 26b and 26c on the inner peripheral surface abutting against the pipe, the front end surface biting into the pipe when the nut is tightened and the rear end surface abutting against the nut.

Although the pipe coupling shown in FIG. 1 is straight and symmetrical, the present invention can be embodied as L-shaped and T-shaped pipe couplings and also as pipe couplings having one end adapted for attachment to walls.

What is claimed is:

1. A pipe coupling comprising a hollow main body having two ends, at least one of the ends having an externally threaded portion and a tapered portion on its inner surface; a cap nut having an internally threaded portion engageable with the externally threaded portion of the main body and a pipe passing bore formed in the center of its top wall; a sleeve provided on its outer surface with a tapered portion for engagement with said tapered portion of said hollow main body, said tapered portion of said sleeve for engagement with said tapered portion of said hollow main body having a smaller angle of inclination than the angle of inclination of said tapered portion of the main body, the sleeve being formed with a ceramic coating layer over its entire surface, the main component of said ceramic coating layer being selected from the group consisting of TiC, $Al_2O_3$ and TiN, the ceramic coated leading edge of the inner surface at said tapered portion of said sleeve biting into the outer surface of the pipe coupled therewith and forming a firm, sealing connection with said pipe without pipe seizure.

2. A pipe coupling comprising a hollow main body having two ends, at least one of the ends having an externally threaded portion and a tapered portion on its inner surface; a cap nut having an internally threaded portion engageable with the externally threaded portion of the main body and a pipe passing bore formed in the center of its top wall; a front sleeve provided on its outer surface with a tapered portion for engagement with said tapered portion of said hollow main body, said tapered portion of said sleeve for engagement with said tapered portion of said hollow main body having a smaller angle of inclination than the angle of inclination of said tapered portion of the main body and a tapered recessed portion formed in its rear end centrally thereof; and a rear sleeve disposed to the rear of the front sleeve and provided at its front end with a tapered portion for engaging said tapered recessed portion in the rear end of said front sleeve, said tapered portion of said rear sleeve having an angle of inclination smaller than the angle of inclination of said tapered portion in said rear end, the front sleeve being formed with a ceramic coating layer over its entire surface, the rear sleeve being formed with a ceramic coating layer at least on the inner peripheral surface abutting against the pipe, the main component of said ceramic coating layers being selected from the group consisting of TiC, $Al_2O_3$ and TiN, the inner edge of said ceramic coated at the front end surface of said front sleeve and the inner edge of said ceramic coating at the front end of said rear sleeve biting into the pipe and the rear end surface abutting against the nut, over its entire surface when said cap nut is threaded onto said externally threaded portion of said main body, said biting inner edges forming a firm, sealing connection with said pipe without pipe seizure.

3. A pipe coupling as set forth in claim 1 or 2 wherein a ceramic coating layer is 2–50 μm in thickness.

* * * * *